(12) United States Patent
Tan et al.

(10) Patent No.: US 7,441,077 B2
(45) Date of Patent: Oct. 21, 2008

(54) DEVICE FOR TRANSMITTING DATA AND METHOD FOR THE SAME

(75) Inventors: Shuai Tan, Beijing (CN); Zhengjun Zhou, Beijing (CN); Yuan Zhao, Beijing (CN)

(73) Assignee: Vimicro Corporation, Beijing (CN)

( * ) Notice: Subject to any disclaimer, the term of this patent is extended or adjusted under 35 U.S.C. 154(b) by 381 days.

(21) Appl. No.: 11/304,101

(22) Filed: Dec. 14, 2005

(65) Prior Publication Data

US 2007/0038835 A1  Feb. 15, 2007

(30) Foreign Application Priority Data

Aug. 10, 2005 (CN) ............. 2005 1 0089896

(51) Int. Cl.
*G06F 12/06* (2006.01)
(52) U.S. Cl. .............. 711/112; 711/114; 711/202
(58) Field of Classification Search .......... None
See application file for complete search history.

(56) References Cited

U.S. PATENT DOCUMENTS

| 5,809,295 A * | 9/1998 | Straub et al. ............... 707/1 |
| 6,604,170 B1 * | 8/2003 | Suzuki ...................... 711/111 |
| 2006/0004969 A1 * | 1/2006 | Suda ......................... 711/154 |
| 2006/0107009 A1 * | 5/2006 | Ooshima et al. ............ 711/163 |

\* cited by examiner

*Primary Examiner*—Than Nguyen
(74) *Attorney, Agent, or Firm*—Joe Zheng

(57) ABSTRACT

Techniques for a simple file system for facilitating file transmission are disclosed. According to one aspect of the techniques, a storage device comprises a memory, a creation module, a status record module and a data reading/writing module. The creation module creates a parameter block, a file allocated table, a root directory and a data area in the memory. The starting address of the data area is calculated according to parameters in the parameter block. The status record module stores a last writing address of a last writing access to the memory. The data reading/writing module reads data from the data area according to the starting address and the last writing address.

10 Claims, 4 Drawing Sheets

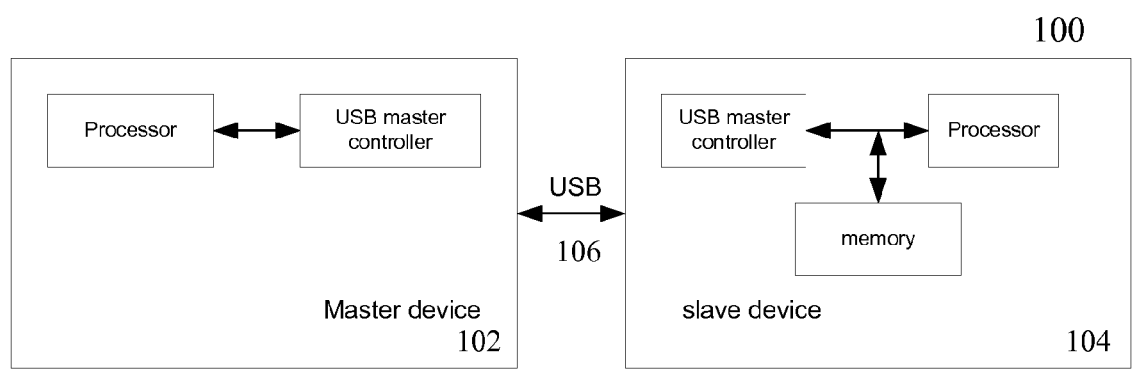
(Prior Art) FIG. 1
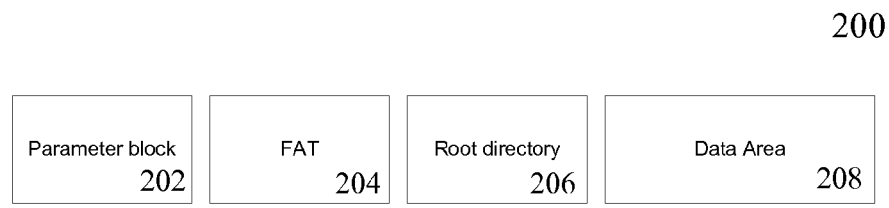
(Prior Art) FIG. 2

DEVICE FOR TRANSMITTING DATA AND METHOD FOR THE SAME

BACKGROUND OF THE INVENTION

1. Field of the Invention

The present invention relates to the area of data communication, and more particularly to method and device for multiple master devices to access slave devices via a data bus (e.g., a unibus). In one embodiment, a device gets data from other equipments by using a simple customized file allocation table (FAT) file system. Based on the Universal Serial Bus (USB) Technology, Mass Storage Technology (MST) and FAT File System, the device realizes single file transmission with any equipment.

2. Description of Related Art

Generally, a Universal Serial Bus (USB) interface can support data exchange or communication between two equipments. FIG. 1 shows a standard block diagram of a communication system provided with a Universal Serial Bus (USB) interface, by which a master device of the system is able to communicate with a slave device. The master device can autonomously initiate communication operations and send commands and data over the USB. The slave device can respond to the external stimulus of the master device by providing data or status report on the USB.

When a USB Mass Storage Equipment, such as a U-disk or a mobile hardware which serves as a slave device, is inserted into a USB connector of a personal computer which serves as the master device. It is assumed that the master device is installed a Windows Operating System (OS), such as Windows 2000 or Windows XP, the Windows OS will automatically detect and identify the USB equipment. If the USB storage equipment is used for the first time, it should be formatted according to a File Allocation Table (FAT) system or New Technology File System (NTFS) by the personal computer, otherwise, it can be directly accessed by the personal computer.

Specifically, the master device may send a reading or a writing command specified in a Mass Storage protocol to the USB equipment. The USB storage equipment interprets these commands and sends operation commands to a memory thereof. The Mass Storage protocol is a USB disk operation protocol cluster based on the USB protocol to encapsulate the minitype computer interface SCSI protocol. In fact, the data in the USB storage equipment is managed by the file system of the personal computer.

A storage device does not need to be embedded with a file system to manage the data therein. However, some special storage modules, such as those in a MP3 player or a mobile telephone, need to embed a file system to conveniently manage the data therein.

FIG. 2 shows a block diagram of a file system 200 embedded in a USB storage device. When the USB storage device is formatted, a parameter block 202, one or more file allocation tables 204, a root directory 206 and a data area 208 are created. The parameter block 202 contains various descriptive information of the USB storage device, such as a sector number per FAT, a volume of each sector and each cluster, a number of reserved sectors, a number of FATs, a total sector number managed by the file system, file system types and signature etc.. The root directory 206 contains files names and a first cluster number assigned to each files. The FAT contains link lists of clusters assigned to the files which ensure the file can be stored in discontinuous sectors.

When a file on the USB storage device requires to be accessed, the first cluster number assigned to the file is obtained from the root directory 206. From the entry point on, the number of the next cluster assigned to the file is obtained from the FAT, until an end-of-cluster mark is encountered. However, this file system has following deficiencies: firstly, it takes a relative long time to develop a USB storage device with a conventional file system as such the overall cost of the product is of high. Secondly, in some special applications, such as only one file needs to be stored during the whole service life of the USB storage device, it becomes efficient to use such USB storage device with an embedded file system.

Thus there is a need for techniques for providing a simple file system to facilitate the file transmission.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to a simple file system for facilitating file transmission. According to one aspect of the present invention, a memory for storing data, a creation module for creating a parameter block, a file allocated table, a root directory and a data area in the memory, a starting address of the data area being calculated according to at least some of parameters in the parameter block, a status record module for storing a last writing address of a last writing access to the memory; and a data reading/writing module reading data from the data area according to the starting address and the last writing address.

According to another aspect of the present invention, the present invention is a method for transmitting data in a storage device, which comprises a memory, a creation module, a status record and a data reading/writing module, the creation module being adapted for create a parameter block, a file allocated table, a root directory and a data area in the memory. The method comprises calculating a starting address of the data area according to parameters in the parameter block; orderly writing data into continuous sectors of the data area from the starting address on; storing a last writing address of a last writing accessing to the memory till the writing operation complete; and reading data from the data area according to the starting address and the last writing address.

One of the objects, features, and advantages of the present invention is to provide techniques for multiple master devices accessing one or more slave devices via a single data bus.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better Understood with regard to the following description, appended claims, and accompanying drawings where:

FIG. 1 shows a standard block diagram of a communication system provided with a Universal Serial Bus (USB) interface;

FIG. 2 shows a block diagram of a file system in a conventional USB storage equipment;

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 3:
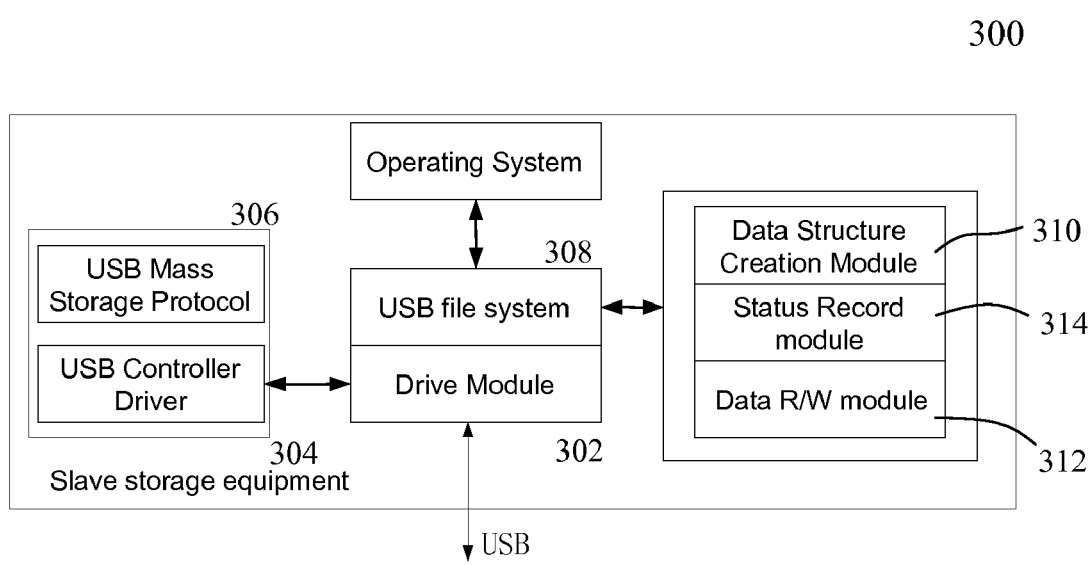
FIG. 3 is a block diagram showing a slave storage device in accordance with one embodiment of the present invention.

Referring now to the drawings, in which like numerals refer to like parts throughout the several views. FIG. 3 is a block diagram showing a slave storage device 300 in accordance with the present invention. The slave storage device comprises a driver module 302 which includes a USB controller driver 304 and a USB mass storage protocol 306, and a USB file system 308. The file system 308 in accordance with the present invention comprises a data structure creation module 310, a data Reading/Writing (R/W) module 312 and a status record module 314 coupled between the data structure creation module 310 and the data R/W module 312.

Figure 4:
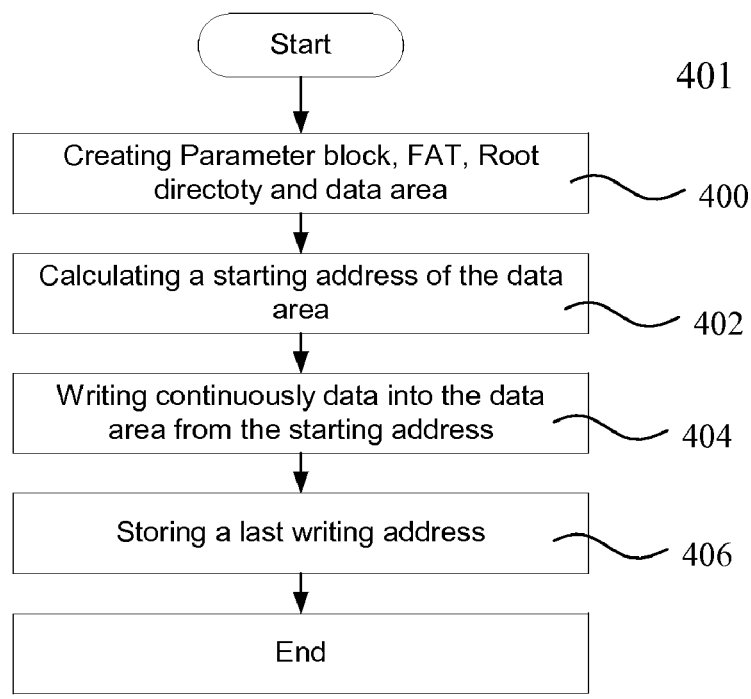
FIG. 4 is a block diagram of data communication between a master device and a slave device, in accordance with one embodiment of the present invention.

Referring to FIG. 4, there shows a flowchart or process 401 for creating data structure and writing data into a slave device. The process 401 may be implemented in hardware or software as a method or an apparatus. The process 401 may be readily understood in conjunction with FIG. 3. To facilitate the understanding of the process 401, the following description of the process 401 is based on FIG. 3. Those skilled in the art will appreciate that the process 401 may be applied well beyond FIG. 3.

The data structure creation module 310 of FIG. 3 is provided to create a parameter block, one or more FATs, a root directory and a data area on a memory area of the slave storage device at 400. In a sense, the data structure creation module 310 serves as an initialization module. The parameter block contains parameters such as volume of each sector and each cluster, a number of reserved sectors, a number of FATs, a number of directory entries, a sector number occupied by the FAT, and a total sector number managed by the file system, file system types and signature, etc. The data structure creation module 310 is provided to further calculate a start address of the data area at 402 according to following formula:

$$start_{Position} = reserve\_sect + fats \times fat\_length + dir\_entries \times 32 \div sector\_size,$$

where, $start_{Position}$ indicates a start address of the data area, reserve_sect indicates the number of the reserved sectors, fats indicates the number of the FATs, fat_length indicates the sector number occupied by one FAT, dir_entries is the number of the root directory, and sector_size indicates the size of each sector.

To further understand the data structure creation module 310, the creating operation 400 is further described. Firstly, to initialize the data structure, namely, to define basic information of the memory of the slave storage device, including the total volume, the volume of each sector and each cluster, etc. Secondly, to create the parameter block, namely to initialize the data structure of the parameter block according to the FAT file system standard, and set the size of each sector, the sector number in each cluster, the sector numbers occupied by the FAT, the total sector numbers managed by the file system, etc., according to the defined basic information. Subsequently, to create the FAT. To create the root directory, all data in this area is set to the value of 0×0 at 402.

At 404, a master device orderly writes data into continuous sectors of the data area from the starting address via the Mass Storage Protocol. The process 401 goes onto 406, where the status record module 314 stores a last writing address in a last writing access to the slave storage device. In this operation, the status record module 314 obtains the number of a current writing sector and determines if the sector number of the current operation is larger than that already stored therein. If so, the number of the current operation refresh as the last writing address, otherwise, continuous to obtain the number of the current writing sector.

Figure 5:
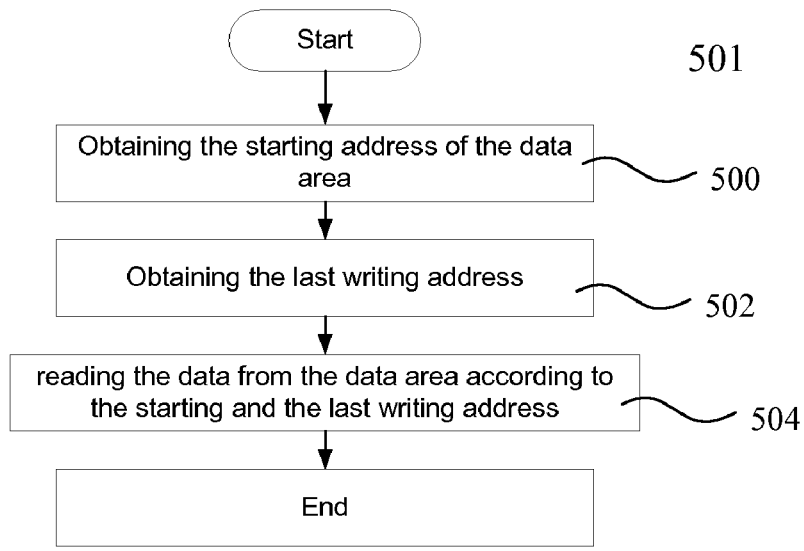
FIG. 5 is a flowchart or process showing of reading data from a slave storage device.

FIG. 5 is a flowchart or process 501 for creating data structure and reading data from a slave storage device. The process 501 may be implemented in hardware or software as a method or an apparatus. The process 501 may be readily understood in conjunction with FIG. 3. To facilitate the understanding of the process 501, the following description of the process 501 is based on FIG. 3. Those skilled in the art will appreciate that the process 501 may be applied well beyond FIG. 3.

After a master device and the slave storage device are disconnected, the data writing operation completes and the data reading process may be performed in the master device. The data reading process begins at 500, where the starting address of the data area is obtained from the data structure creation module 310. At 502, the last writing address of the data area is obtained from the status record module 314. At 504, the data R/W module 312 reads the data from the data area according to the starting address and the last writing address of the data area.

Comparing with the data reading method of the prior art, the data reading in the present invention does not need to interpret the directory entries and FAT data structure. In contrast, it determines the starting address of pending data according to the data structure creation module 310 and determines the ending address of the pending data according to the status record module. Therefore, the data reading in accordance with the present invention is considerably simple and efficient.

In one embodiment, the parameter block can be fixed in the memory of the slave storage device, so it needs not to be created by the data structure creation module 310. The data structure creation module 310 creates parameters such as the FAT, directory entries the sector numbers occupied by the FAT table, the number of reserved sector and the number of the FAT etc. according to the fixed parameter block.

Figure 6:
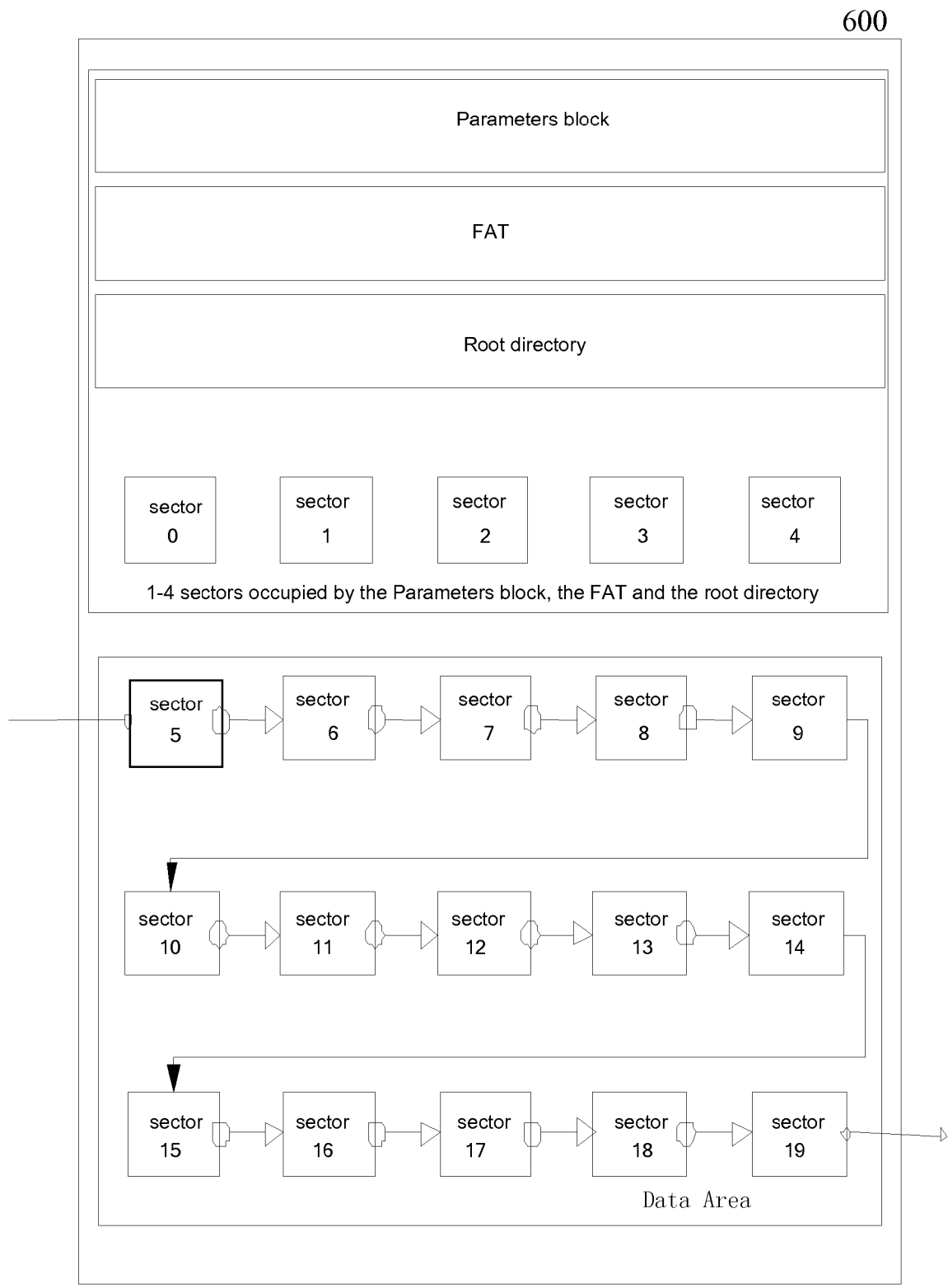
FIG. 6 is a block diagram showing one specific embodiment of data structure of the file system in a slave storage device.

Referring now to FIG. 6, there is a block diagram showing one specific embodiment of data structure 600 of the file system in a slave storage device. The sectors of the memory designated numeral 0-4 are used to store the parameter block, the FAT and the root directory. The sector designated numeral 5 is a starting address of the data area. According to writing operation rule of the FAT file system, writing into the consecutive sectors is a priority selection, supposing the lasting writing address is the sector designated numeral 19. The data stored between the sector 5 and the sector 19 should be an object file data.

The file system of the present invention is of a simple file transmission technology based on the USB protocol. This technology is applicable to the single file transmission of the computers and supports USB technology and FAT file systems. The single file transmission generally meets the special requirement of the device, such as the firmware updating, including software/driver updating. There are many features, benefits or advantages of the present invention. One of them is easy operations to various applications and developments of devices as the execution code occupies a little space. Another one of the features, benefits or advantages of the present invention is that now it makes a device more conveniently to transmit a file. Without any driver, application program or configuration, a user can quickly transmit data to a target device. As it can be appreciated that this invention may save considerable development time because no drivers and application programs are needed.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A storage device comprising:
   a memory for storing data;
   a creation module for creating a parameter block, a file allocated table, a root directory and a data area in the memory, a starting address of the data area being calculated according to at least some of parameters in the parameter block;
   a status record module for storing a last writing address of a last writing access to the memory; and
   a data reading/writing module reading data from the data area according to the starting address and the last writing address.

2. The storage device as claimed in claim 1, wherein the data reading/writing module writes data sequentially into continuous sectors of the data area from the starting address onwards.

3. The storage device as claimed in claim 1, wherein the status record module obtains a sector number currently being wrote by the data reading/writing module and determines if the current sector number is larger than the last writing address, If so, the current sector number refreshes as the last writing address until a writing operation of the data reading/writing module completes.

4. The storage device as claimed in claim 1, wherein the parameter block contains parameters that include a volume of each sector and each cluster, a number of reserved sectors, a number of FATs, a sector number occupied by one FAT, a number of the root directory, and wherein the starting address of the data area is calculated according to:

$$\text{start}_{Position} = \text{reserve\_sect} + \text{fats} \times \text{fat\_length} + \text{dir\_entries} \times 32 \div \text{sector\_size},$$

where $\text{start}_{Position}$ indicates the starting address of the data area, reserve_sect indicates a number of the reserved sectors, fats indicates a number of FATs, fat_length indicates the sector number occupied by one FAT, dir_entries is a number of the root directory, and sector_size indicates a volume of each sector.

5. The storage device as claimed in claim 1, further comprising a USB interface.

6. The storage device as claimed in claim 1, further comprising a USB controller driver and a USB mass storage protocol.

7. A method for transmitting data in a storage device that includes a memory, a creation module, a status record and a data reading/writing module, the creation module being provided to create a parameter block, a file allocated table, a root directory and a data area in the memory, the method comprising;
   calculating a starting address of the data area according to parameters in the parameter block;
   writing data into continuous sectors of the data area from the starting address onwards;
   storing a last writing address of a last writing access to the memory before such a writing operation completes; and
   reading data from the data area according to the starting address and the last writing address.

8. The method as claimed in claim 7, wherein a storing operation comprises:
   obtaining a sector number currently writing;
   determining if a current sector number is larger than the last writing address;
   if so, refreshing the last writing address by the current sector number before a writing operation completes.

9. The method as claimed in claim 7, wherein calculating of the starting address of the data area is performed in accordance with:

$$\text{start}_{Position} = \text{reserve\_sect} + \text{fats} \times \text{fat\_length} + \text{dir\_entries} \times 32 \div \text{sector\_size},$$

where $\text{start}_{Position}$ indicates the starting address of the data area, reserve_sect indicates a number of reserved sectors, fats indicates a number of FATs, a fat_length indicates a sector number occupied by one FAT, a dir_entries length is a number of the root directory, a sector_size indicates a volume of each sector.

10. The method as claimed in claim 7, wherein an operation of the writing or reading obeys a USB mass storage protocol.

* * * * *